(12) United States Patent
Rao et al.

(10) Patent No.: US 6,400,468 B1
(45) Date of Patent: Jun. 4, 2002

(54) SMOOTHING CALIBRATION FILES TO IMPROVE REPRODUCTION OF DIGITIZED IMAGES

(75) Inventors: Ravishankar Rao, White Plains; Frederick Cole Mintzer, Shrub Oak, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/052,563

(22) Filed: Mar. 31, 1998

(51) Int. Cl.[7] .......................... G06F 15/00; H04N 1/46; G03F 3/08
(52) U.S. Cl. .................. 358/1.9; 358/504; 358/529
(58) Field of Search ................... 358/1.9, 520, 501, 358/504, 506, 505, 512, 509, 518, 519, 527, 535; 382/264, 274, 260

(56) References Cited

U.S. PATENT DOCUMENTS

| | | | | |
|---|---|---|---|---|
| 3,573,797 A | * | 4/1971 | Kopelson | 340/347 DA |
| 3,680,957 A | * | 8/1972 | Fukuda | 356/97 |
| 5,095,431 A | * | 3/1992 | Feldman et al. | 364/413.13 |
| 5,363,213 A | * | 11/1994 | Coward et al. | 358/455 |
| 5,452,090 A | * | 9/1995 | Progler et al. | 356/401 |
| 5,594,484 A | * | 1/1997 | Furukawa | 347/95 |
| 5,835,129 A | * | 11/1998 | Kumar | 348/15 |
| 5,870,191 A | * | 2/1999 | Shirley et al. | 345/356 |
| 6,072,603 A | * | 6/2000 | Parks | 358/504 |
| 6,094,502 A | * | 7/2000 | Hirata et al. | 382/167 |
| 6,212,975 B1 | * | 4/2001 | Cook | 78/861 |
| 6,222,615 B1 | * | 4/2001 | Suzuki | 355/68 |

* cited by examiner

*Primary Examiner*—Madeleine Nguyen
(74) *Attorney, Agent, or Firm*—Thomas A. Beck; Louis P. Herzberg (57) ABSTRACT

A method, system and computer article are presented for smoothing an image calibration signal in order to smooth a reproduced signal, and to identify the presence of any remaining spikes or other significant deviations. The invention recognizes the problems with raw calibration signals, and posits that the calibration signals be filtered by methods and systems described. For example, calibration data may be smoothed by fitting the calibration data to a parametric model employing either linear or non-linear least squares. Alternate techniques implement smoothing using optimal filtering. An aspect of the invention is a method, computer product or article of manufacture for improving an initial calibration profile having an initial profile extent to form an improved calibration profile. The initial profile may be formed for a scanner employing a linear array CCD and having a particular direction of motion. One method includes forming an extended profile extent in the direction of motion using quadratic extrapolation, applying multirate filtering to the extended profile to form a filtered profile, and truncating the filtered profile to bring it to the initial profile extent to form the improved calibration profile.

13 Claims, 9 Drawing Sheets

SMOOTHING CALIBRATION FILES TO IMPROVE REPRODUCTION OF DIGITIZED IMAGES

FIELD OF THE INVENTION

The present invention is directed to the field of digital imaging and more specifically directed to reproduction of digitized images.

BACKGROUND OF THE INVENTION

It is becoming more and more important to be able to store vast amounts of digitized images in storage media. The so stored image becomes available for display or reproduction. Images are normally stored with separate data representing a color plane for each color. Thus a color image represented in red, green and blue (RGB), has three color planes. A monochrome image has a single color plane. The color plane data is used to reproduce the color image. The faithfulness of the reproduction is affected by several factors. One of these factors is the usage of a white calibration profile. It is an essential part of digital capture achieved through many scanners. The white calibration profile forms the basis for applying corrections to each measured RGB signal. There are several reasons for the need for such a correction. The reasons stem from the operating environment of the scanner and the response of the scanner elements, the CCD pixels. First, it is practically impossible to achieve perfectly uniform illumination of the object to be imaged. There is typically some variation of the intensity level of the incident illuminant light as a function of the position on the imaging table, and also as a function of time. Secondly, the response of the CCD pixels may also vary with time, and the signal gain may vary from one pixel to another. An attempt to overcome these problems uses a technique to normalize the response of each CCD pixel relative to a reference signal. The reference signal is typically the reflection or emission from a calibration surface at each pixel, and/or the absence of a reflection or transmission passing through a surface.

A calibration surface is used to measure a reference signal which is employed for purposes such as normalization and standardization of arbitrary signals. The reference signal is also termed the calibration profile. A typical embodiment of a calibration surface reflecting light takes the form of a white diffuse reflector such as chromalin, in which case the calibration profile is also termed the white calibration profile. Other surfaces may be employed in the scope and spirit of this invention.

A prevalent method is to directly employ the scanned image of a white reflecting and/or emitting surface to create a white calibration profile, and the scanned image of darkness to create a black calibration profile. Darkness is also referred to herein as a dark image. All subsequent scans are normalized with respect to these white and black profiles. However, it has been found that several problems may interfere in the development of valid calibration profiles. The white signal typically contains high frequency variations, caused by variations in the light source as well as the CCD response of each pixel. Furthermore, the white calibration image may contain regions of relatively low intensity around the edges, especially if the size of the white reflecting and/or emitting surface is inappropriate. Finally, power supply variations may cause spikes in the white and or black calibration profiles.

The techniques employed heretofore in developing a white and/or black calibration profile do not overcome several key obstacles. These obstacles are typically encountered in the practical implementations to obtain valid calibration data values. One obstacle is the variations in the light source, and in the response of the CCD pixels. These tend to induce variations in the white calibration data. Another obstacle is the spikes in the system power supply which may severely corrupt the white calibration data. Also, blotches on the white calibration surface as well as dust on the camera optics generally cause errors during the calibration process.

It is noted that digitized images are employed for forming digital libraries. These encompass digital capture, storage, retrieval and rights management of a large number of objects such as paintings and manuscripts. The digital capture system ought to support accurate color reproduction so that the digitized image captures the original as faithfully as possible. These depend upon developing and using a valid white and/or black calibration signal.

Thus, a solution is sought which smooths the white and/or black calibration file to remove high frequency variations, extends the white and/or black signal all the way to the boundaries, and removes the effects of power source spikes. It is also advantageous that the solution include the flagging of the presence of problems in the white and/or black calibration data, such as unacceptable deviations. Without the flagging of these problems, a corrupt white and/or black calibration profile could be erroneously used, rendering all subsequent scans that are based on this calibration to be faulty.

SUMMARY OF THE INVENTION

In an embodiment the invention provides a system for obtaining at least one calibration profile for an image scanning apparatus, the system comprising: a light source; a white image having a surface illuminated by the light source; a detector to measure an intensity of light reflected and/or emitted from the white image at a plurality of positions; a first memory to store a first plurality of light intensity values measured by the detector at each of the positions; and a smoothing module to smooth the plurality of light intensity values in the first memory so as to form a white calibration profile.

In an embodiment of the invention the system further comprises a value corrector to correct a second plurality of light intensity values measured by the detector for the light reflected; and/or emitted from an arbitrary image at each of the positions using the white calibration data; and/or the white image has uniform reflectivity and/or emissivity across the surface; and/or the smoothing module is useful to employ filtering; and/or the smoothing module is useful to employ extrapolation and decimation upon data of a subset of the plurality of positions, and/or the detector is also useful to measure an intensity of light from a dark image at the plurality of positions, and the first memory is to also store a plurality of black intensity values measured by the detector at each of the positions to form a black calibration profile, and/or the smoothing module is also useful to smooth the plurality of black intensity values in the first memory, and/or the smoothing module is useful to employ extrapolation, filtering and decimation upon data of a subset of the plurality of positions.

Another aspect of the invention is a system for scanning images, comprising: means for providing light; means for measuring at a number of positions the intensity of light emitted from the means for providing light transmitted through a transparent object (which includes air etc.) to form a first raw profile; and means for smoothing the first raw profile to form a white calibration profile. In some embodiments the system further comprises means for measuring the intensity of light from the light transmitted through an opaque object at the number of positions to form a second raw profile; and means for smoothing the second raw profile to form a black calibration profile; and/or means for measuring the intensity of light from the light transmitted through a semi-transparent object at the number of positions to form a semi-transparent object profile; and means for correcting the semi-transparent object profile using the white calibration profile; and/or means for correcting the semi-transparent object profile using the black calibration profile.

Another aspect of the invention is a method for improving an initial calibration profile having an initial profile extent to form an improved calibration profile, the initial profile formed for a scanner employing a linear array CCD and having a direction of motion, the method comprising: forming an extended profile extent in the direction of motion using quadratic extrapolation; applying multirate filtering to the extended profile to form a filtered profile; and truncating the filtered profile to bring it to the initial profile extent to form the improved calibration profile.

In one embodiment of this aspect, the method further comprises comparing the improved calibration profile to the initial calibration profile to determine at least one occurrence of a problem condition; and flagging said at least one occurrence; and/or evaluating the flags of said at least one occurrence to determine the usability of the improved calibration profile, and/or the calibration profile is a white calibration profile; and/or the step of forming extends a subset of the initial calibration profile by a factor of four.

Another aspect of the invention is an article of manufacture comprising: a computer usable medium having computer readable program code means embodied therein for causing the development of a valid calibration profile for a scanning system, the computer readable program code means in said article of manufacture comprising computer readable program code means for causing a computer to effect: scanning an image to obtain the plurality of calibration signals to an initial extent of the image; extrapolating the calibration signals to form extended range signals; applying multirate filtering to the extended range signals to form a plurality of filtered signals; and truncating the plurality of filtered signals to the initial extent to form said at least one valid profile.

In an embodiment the article of manufacture, the at-least-one-valid profile includes both a white and a black calibration profile, and/or further comprising computer readable program code means for causing the computer to effect scanning an arbitrary image to obtain a plurality of arbitrary signals; and employing said at least one calibration profile to correct the plurality of arbitrary signals.

Another aspect of the invention is a program storage device readable by machine, tangibly embodying a program of instructions executable by the machine to perform method steps for developing a valid calibration profile for a scanning system, said method steps comprising: scanning an image to obtain the plurality of calibration signals to an initial extent of the image; extrapolating the calibration signals to form extended range signals; applying multirate filtering to the extended range signals to form a plurality of filtered signals; and truncating the plurality of filtered signals to the initial extent to form said at least one valid profile. In an embodiment the program storage device readable by machine, the at-least-one-valid profile includes both a white and a black calibration profile.

Another aspect of the invention is a method for scanning images, the method comprising: providing a source of light; measuring at a number of positions on a transparent object, the intensity of light emitted from the source of light transmitted through the transparent object and forming a first raw profile; and smoothing the first raw profile to form a calibration profile. In some embodiments the method further comprises: measuring the intensity of light from the source of light transmitted through an opaque object at the number of positions to form a second raw profile; and smoothing the second raw profile to form a black calibration profile; and/or measuring the intensity of light from the source of light transmitted through a semi-transparent object at the number of positions to form a semi-transparent object profile; and correcting the semi-transparent object profile using the white calibration profile; and/or means for correcting the semi-transparent object profile using the black calibration profile.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

Figure 1A:
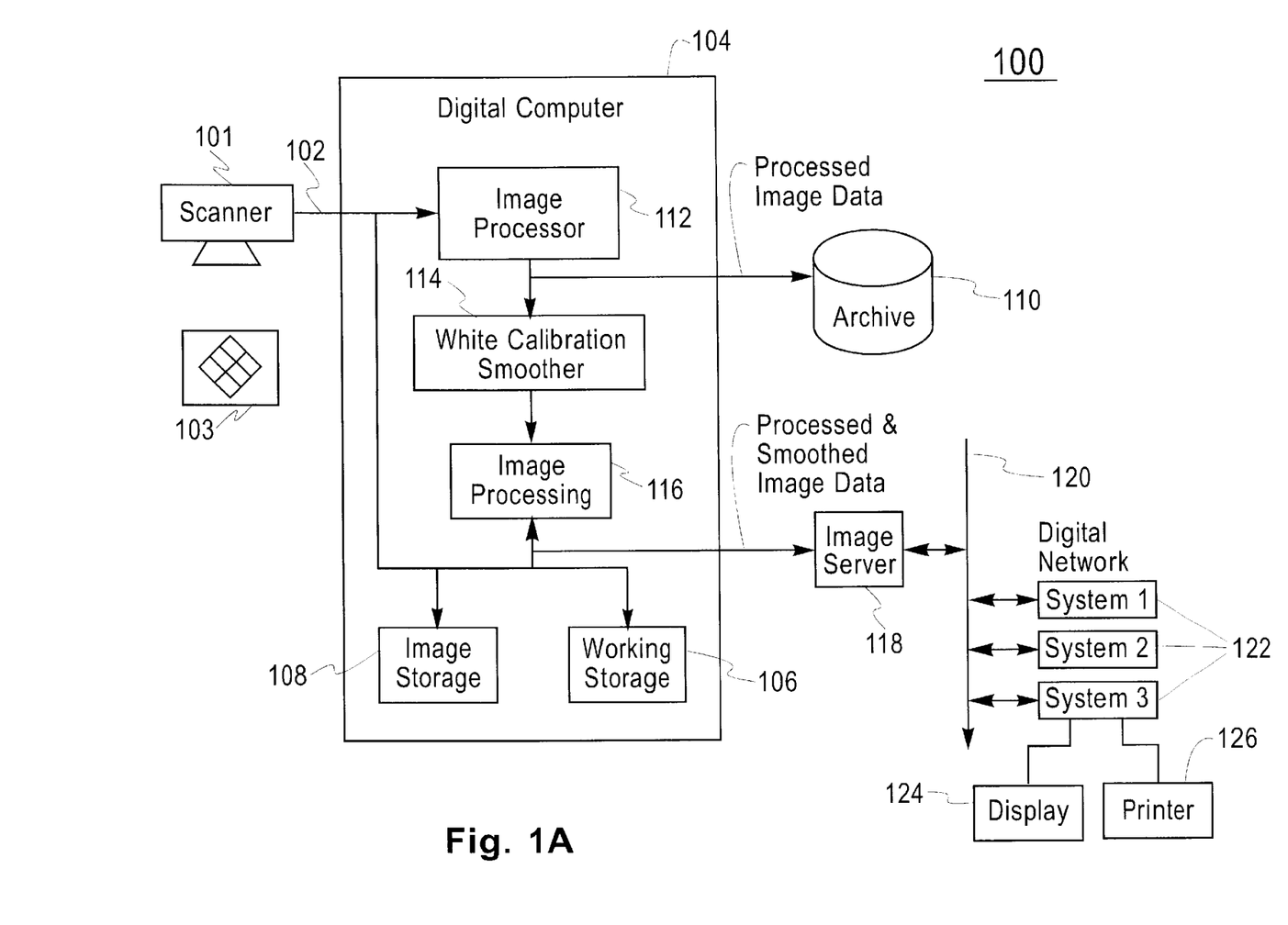
FIG. 1(a) shows a block diagram of a typical system embodiment for improving the white and/ or black calibration of a scanner through the use of smoothing.

FIG. 1(a) shows a block diagram of a typical system embodiment for improving the white and/or black calibration of a scanner through the use of smoothing. It shows an image capture and distribution system 100. The system 100 includes a scanner 101 which captures image data 102 from a physical scene 103. The physical scene 103 is typically a painting, a photograph, a physical object and its surrounds, or a test chart. Although the invention is not limited to any specific context, the scanner 101 sends original image data 102 to a digital computer 104. The computer 104 includes a working storage 106 that is typically embodied in the computer s random access (or other) memory, an image storage system 108 that is often a conventional hard disk drive (or other non-volatile storage device), and an image archive 110 that can be a tape or disk storage (or other non-volatile storage device). The computer 104 also includes a number of modules which are usually implemented in software. These include a front end image processor 112 that performs image processing such as scaling and enhancement of the image data provided by the scanner 101. It also includes white and/or black calibration controller 114 operating in accordance with the principles of the present invention, and back-end image processing software 116 that performs other processing functions. These other processing functions may include compression of the image and storing white and/or black calibration value data 117 for one or more scanners. The white and/or black calibration value data 117 may be used on other digitized images scanned by the scanner 101. Quite often, the unprocessed or front-end digitized original image data 102 is sent to the image archive 110 for preservation in unaltered form.

An alternate embodiment has data of an original image in digitized form 102 and white and/or black calibration value data 117 already available without requiring a scanner 101. The white and/or black calibration software 114 applies white and/or black calibration to the digitized image 102 in accordance with the principles of the present invention. The white and/or black calibration process can also be performed on a copy of an image in the archive 110, or on other scanned and processed image data which has been loaded in whole or in part, into the computer s working storage 106. This may be done provided the other image's data were obtained using the same scanner at scanning conditions similar to the scanning conditions used to obtain the white and/or black calibration value data. Similar conditions means that other images were optically focused using the same scanner and similar settings for such items as focal distance, lens aperture and colored filters.

The processed, white and/or black calibration and compressed image data produced by the combination of modules 112, 114, 116 may be sent from the working storage 106 or image storage 108 to an image server 118 that is connected to a digital network 120. When appropriate, the digital network is interconnected with a Local Area Network (PLAN), a Wide Area Network (WAN) such as the Internet, or both. Other systems 122 connected to the digital network 120 can request and receive images stored on the image server 118 via the digital network 120. In some cases, the systems can then display the received images on a display device 124 and/or print the images on a graphics capable printer 126. Those skilled in the art will recognize that there are many other system configurations in which the present invention could be employed.

Figure 1B:
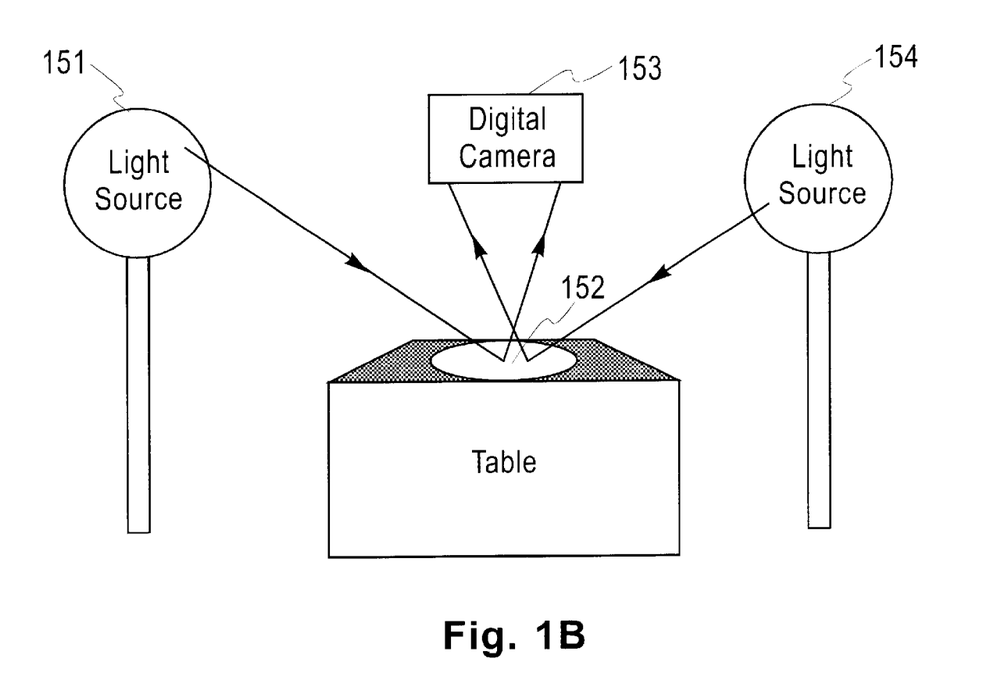
FIG. 1(b) shows a lighting setup with the light source above the image that may be used for digital imaging.

FIG. 1(*b*) shows a lighting setup that may be used for digital imaging. It shows light sources 151 and 154 used to illuminate an object 152. The light reflected (or transmitted through) the object is captured by a light sensitive device such as a CCD chip embedded in a digital camera 153. Examples of suitable light sources are: halogen lamps, tungsten lamps, and fluorescent lamps.

Figure 1C:
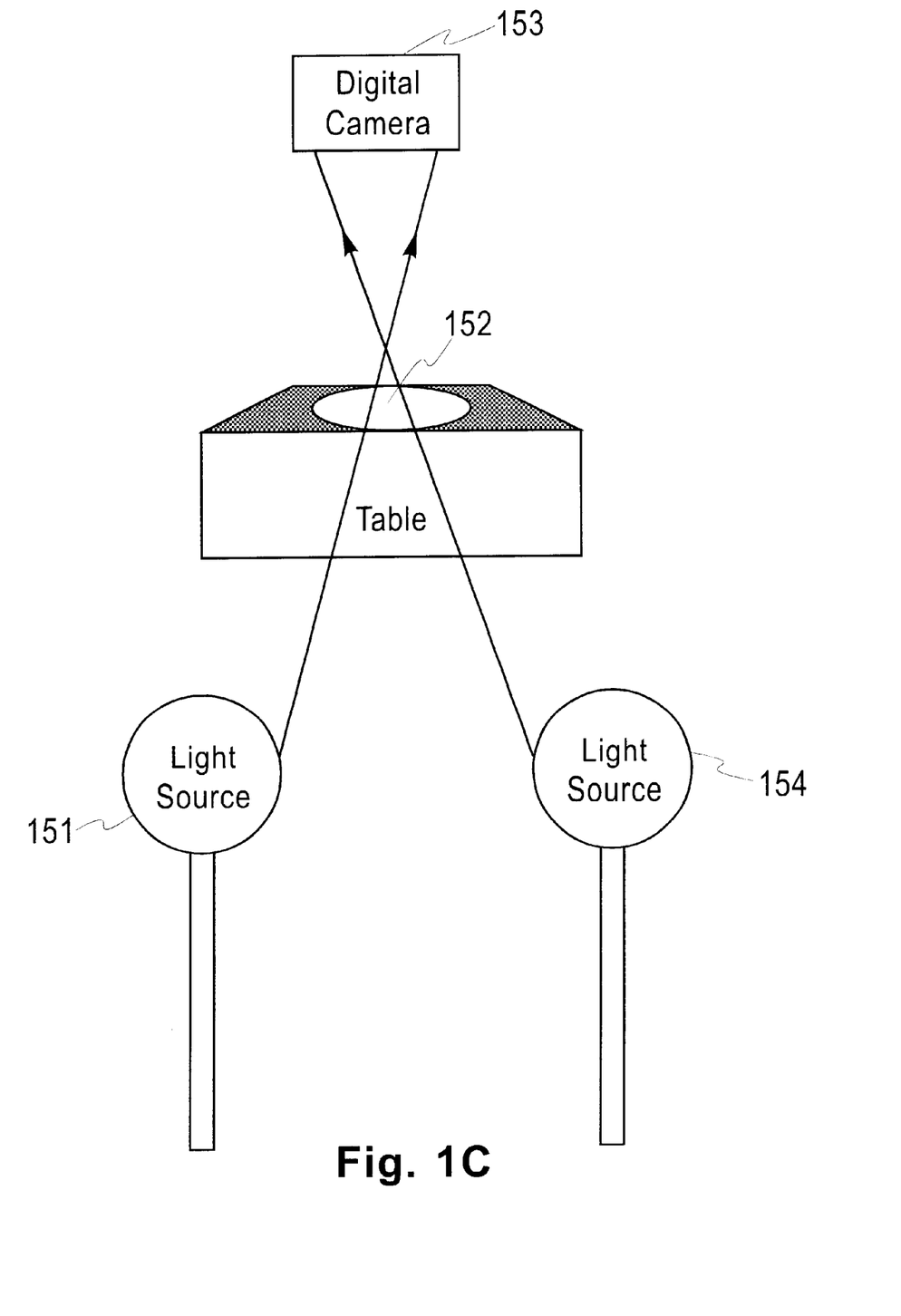
FIG. 1(c) shows a lighting setup with the light source below the image that may be used for digital imaging.

The setup of FIG. 1(*b*) is for a reflective setup, where light bounced off the object 152 is imaged onto a CCD chip contained in a digital camera 153. In a transmissive setup, light transmitted through the object is imaged. In this case, the light sources 152 154 are below the object as shown in FIG. 1(*c*). This is also sometimes referred to as an emissive setup.

Figure 2:
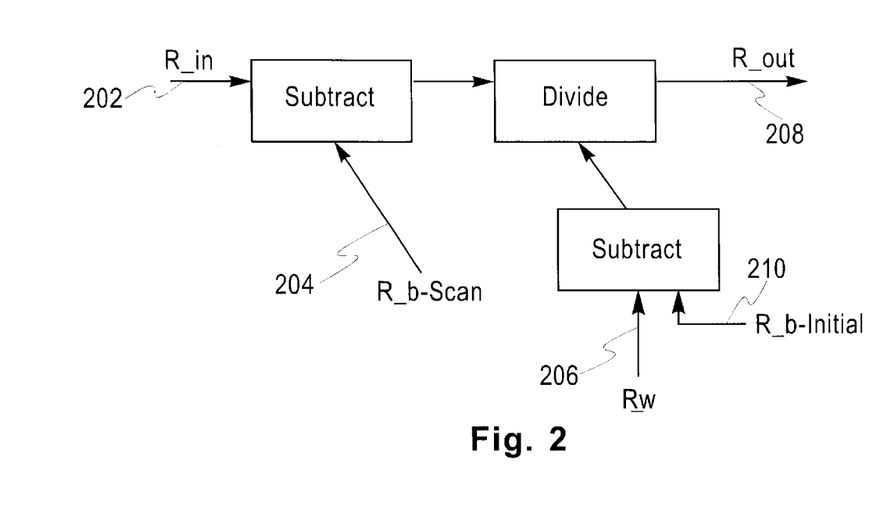
FIG. 2 shows how the black and white signal values are used to arrive at the normalized signal values for an embodiment of the present invention.

In order to get an accurate measurement for the intensity values of color planes of a color image, for example the RGB (red, green, blue) planes, one needs to take into account the CCD signal in the presence of no light (black signal) and maximum light (white signal). The black signal is obtained by placing a black filter in front of the CCD. The white calibration signal is obtained by placing a white diffuse reflector (such as chromalin) under the camera. FIG. 2 shows how the black and white signal values are used to arrive at the normalized signal values. For illustration, the red channel is considered. The output signal, $R_{out}$ 208 is related to the input signal $R_{in}$ 202, the black signal $R_{b-initial}$ 204, $R_{b-scan}$ 210, and the white calibration signal $R_w$ 206 as follows:

$$R_{out}=(R_{in}-R_{b-scan})/(R_w-R_{b-initial})$$

$R_{b-initial}$ is measured at the time of calibration. $R_{b-scan}$ is measured at the scan time of every image. Thus the measurement of white and/or black signal values is critical as it affects every pixel in the scanned image.

Ideally, one would expect the white and/or black signal to be a smooth function of image position, with fairly constant values. However experimentation has shown us that this is not true, for a variety of reasons:

1. The white reflecting surface that is being imaged has blemishes or scratches.
2. The lens or filter may have specks of dirt or dust.
3. There are variations in the lamp intensity as a function of time.
4. The power to the lamps varies as a function of time, and may occasionally contain spikes.
5. The white surface does not cover all of the intended imaging area.
6. Light leakage into the lens when developing the black calibration profile.
7. Power supply spiking and variations.
8. When the scanner has multiple sensors, each sensor has a different characteristic.

Thus, it is necessary to smooth the white and/or black calibration signal in order to eliminate erroneous calibration signals owing to these defects, and/or to identify the presence of any remaining spikes or other significant deviations. This will alert the scanner operator to take necessary corrective actions.

A significant aspect of the present invention lies in recognizing the problems with raw white and/or black calibration signals, and positing that the white and/or black calibration signals be smoothed.

Several techniques were investigated to perform this smoothing operation. In one technique, the white and/or black calibration data may be smoothed by fitting the calibration data to a parametric model. This could employ either linear or non-linear least squares. Alternate techniques implement smoothing using optimal filtering.

When a parametric model is employed it often assumes a form of the function, such as a polynomial for a typical signal denoted by R(x,y). Let 'x' represent a pixel row number, and 'y' represent a pixel column number, then R(x,y) represents the light intensity value measured by the CCD sensor at the pixel location given by 'x' and 'y'. Then:

$$R(x_0,y)=a_0+a_1y+a_2y^2+a_3y^3+\ldots a_{N-1}y^{N-1}$$

where $R(x_0,y)$ is the light intensity value at $x=x_0$. This equation is a polynomial of order 'N−1', and contains 'N' coefficients to be estimated from the data. This estimation can be carried out by the well known procedure of least squares, where the square of the fit error between the estimated polynomial and the actual data is minimized. Other parametric forms can be assumed, such as splines, etc.

The second technique involves using filtering operations, performed upon the white and/or black calibration data. In these operations the true signal is assumed to be corrupted by noise, and the objective is to recover the true signal from the corrupted signal. Typically the noise contains broad spectral frequencies, whereas the signal contains a limited band of frequencies, usually low frequencies. Thus, by using a low-pass filter, one eliminates the high frequencies that are due to noise. The low frequencies that constitute the signal are retained.

For the purpose of describing the present invention, an efficient implementation of low pass filtering is described. However, an interesting aspect of the present invention is that in a further embodiment both the above techniques may be combined to smooth the data. First a parametric fit is performed to fit the end points of the data so as to extend the signal, and then the resulting extended signal is filtered.

An example embodiment of the present invention uses one of the two most popular imagers. These are the line-scan CCDs and the area CCDs. In the line-scan CCD, of which the IBM TDI Pro/3000 scanner is an example, the CCD is a one-dimensional linear array which is translated across the imaging area. In the area CCD, the entire imaging area is captured with a single two dimensional CCD, with no need for translation.

In general, the choice of filtering technique depends upon the type of CCD being used. For linear array CCDs it suffices to apply one dimensional filtering in the direction of translation of the CCD. This is because one does not wish to smooth signal values across CCD pixels, since the CCD pixels may have variable gain. For area CCDS, one may choose to fit a low order polynomial surface patch over the entire two dimensional array, and flag significant deviations between the fitted surface and the actual surface.

Figure 3:
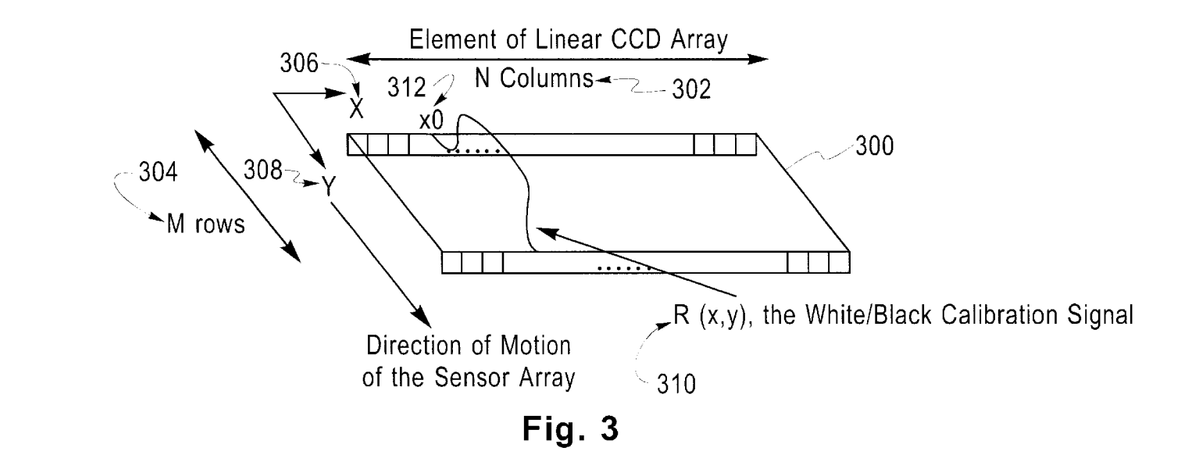
FIG. 3 illustrates an example of a filtering operation performed upon a CCD element in accordance with the present invention.

FIG. 3 illustrates an example of a filtering operation performed upon a CCD element 300. It also shows the coordinate system that is used herein. Let 'N' be the number of pixels in the 'X' direction, and 'M' be the number of pixels in the 'Y' direction. In other words, the CCD element effectively produces an image containing 'M' rows and 'N' columns. A typical signal will be denoted by R(x,y), where 'x' represents a row number, ranging from 1 to 'M' and 'y' represents a column number, ranging from 1 to N, and R represents the light intensity value measured by the CCD sensor at the location given by 'x' 306 and 'y' 308. A typical signal R(x,y) 310 is shown in the figure for the CCD pixel at x=$x_0$ 312. In this example the signal is smoothed in the direction of motion, i.e., we hold 'x' fixed and smooth $R(y)$ at $x=x_o$ for all '$x_o$' ranging from 1 through 'N'.

This type of smoothing is a very important and surprising aspect of the invention. After all, these data are supposed to reflect the true state of the various CCD sensor pixels, where different CCD sensor pixels may have different gains. This causes the output of two CCD pixels, measured in terms of current or voltage, to be different for the same input. The output has a specified amount of illumination measured in units of power, such as watts. In fact, in most cases if the calibration data is smoothed along the direction of the CCD pixels (the 'x' direction, as per FIG. 3), one usually gets poor results as the smoothing is performed across pixels with different gains. This usually defeats the entire purpose of calibration.

Given this consideration, it is not clear whether smoothing the calibration data in the perpendicular direction, i.e. the 'Y' direction, will give rise to better results. A series of experiments were performed to test smoothing in the 'Y' direction. The results were not expected until the experiment was completed. The results showed that smoothing in the Y direction is very advantageous. In most cases it was found that smoothing the white calibration data in the Y direction resulted in the elimination of off-color streaks across the image that occurred due to power surges. Thus, although improper use of smoothing can lead to totally erroneous results, judicious use of smoothing operations however does lead to significant improvements in the white and/or black calibration.

Since the essential filtering techniques are the same, for most CCDS, an implementation example is described for the case of linear array CCDs. The filtering consists of the following steps, summarized in a flowchart in FIG. 4.

Figure 4:
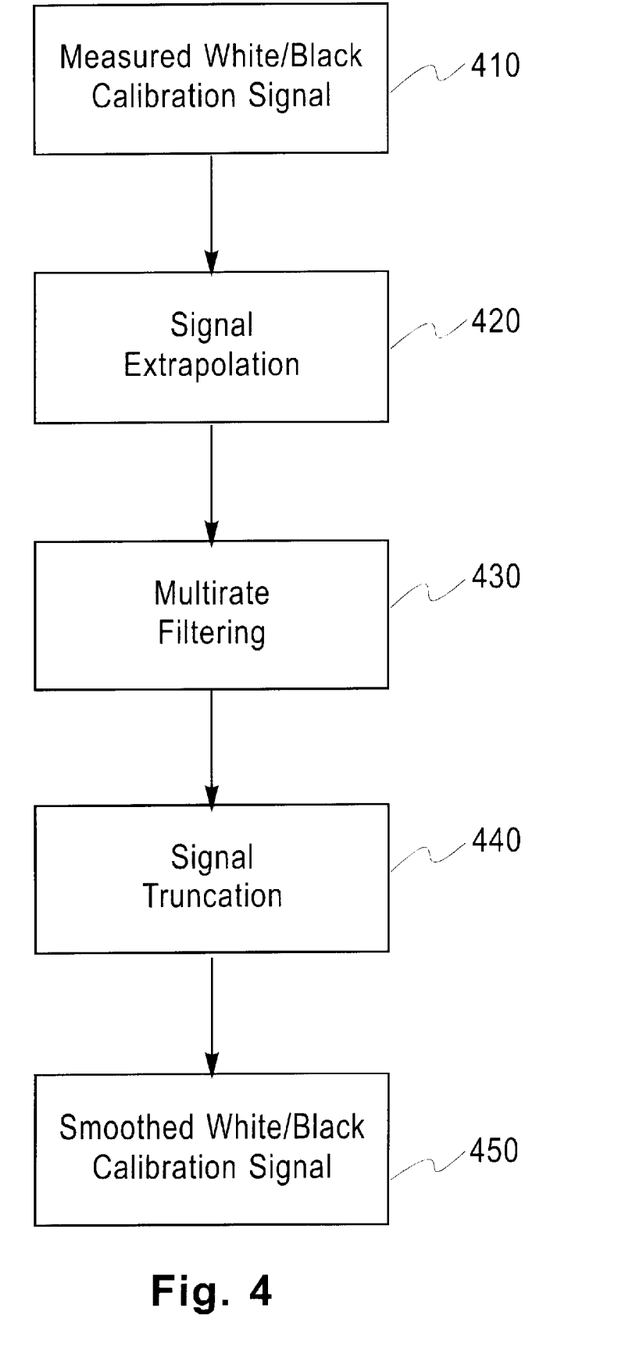
FIG. 4 shows an example of the steps to smooth a white calibration profile, in accordance with the present invention.

1. obtaining a white and/or black calibration signal, R(x,y), containing a plurality of image intensity measurements by scanning a white and/or black object 410 (The white and/or black object may be a white and/or black paper such as 'Chromalin', manufactured by DuPont);
2. extrapolating the signal R(x,y) in either direction along the 'Y' axis, i.e. the direction of motion of the sensor array, using an appropriate extrapolation method, such as quadratic extrapolation 420;
    (Extrapolation refers to the estimation of signal values outside a given interval based on signal values within the interval)
3. applying multirate filtering to the extended signal 430;
4. truncating the result to the extent of the original signal 440;
5. interpreting the truncated signal 440 as the smoothed white and/or black calibration signal 450; and
6. comparing the resulting signal to the original signal so as to flag the occurrence of problem conditions.

In order to perform signal extrapolation almost any filtering operation can be applied to the original signal 'R(x,y)' without modification. However, one of the problems with some filtering technique is the choice of an appropriate treatment of the end signal values. This occurs in the vicinity of y=1 and y=M, where 'y' denotes the row number). Multirate filtering has a tendency to flatten the signal at either end. In order to avoid this, in an example embodiment of the present invention, the original signal is extrapolated at both ends. This may be performed as follows. A fraction of the signal, (say one quarter), at each end is used to estimate a polynomial fit (say a quadratic), and this is used to extrapolate the signal (say to y=−E+1, and y=M+E). Here 'E' denotes the number of points over which the signal is extrapolated, and '$R_E$' denotes the extended signal.

Figure 5A:
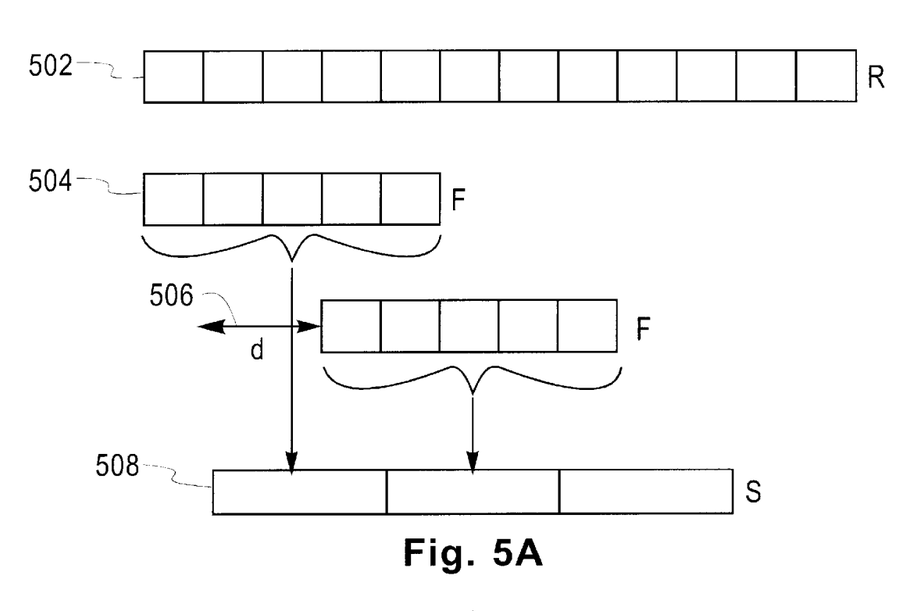
FIG. 5(a) shows an example of a decimation step, in accordance with the present invention.
Figure 5B:
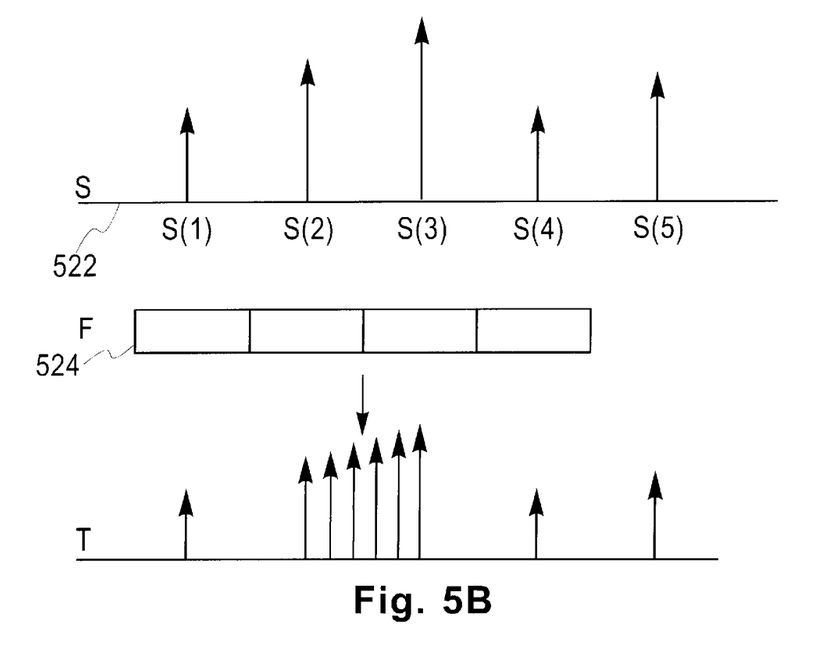
FIG. 5(b) shows an example of an interpolation step, in accordance with the present invention.

In an example embodiment, the signal is extrapolated outward at each end using one quarter of the signal values at the corresponding end with a quadratic fit. The number of points 'E' over which the signal is extrapolated is ten percent of the length of the original signal. In the example embodiment '$R_E$' is filtered using a multirate filtering technique described in, F. Mintzer and B. Liu, "Aliasing Error in the Design of Multirate Filters," ASSP, no. 1, pp 76–88, 1978, which is incorporated herein by reference in its entirety. This is a digital signal processing technique (as opposed to optical filtering), which can be used to implement a low pass filter. Multirate filtering is briefly summarized in the two step shown in FIGS. 5(*a*) and 5(*b*). It starts with a decimation step in which the sampling rate of the signal is decreased by an integer fraction, and is followed by an interpolation step where the number of signal samples is increased by an integral amount. FIG. 5(*a*) shows the decimation step, where the original signal 'R' 502 is downsampled through the successive application of a filter 'F' 504 displaced by an amount 'd' 506 for each application. That is, the filter coefficients 'F' are multiplied with the input signal 'R' to obtain the resulting decimated signal 'S', given by:

$$S=_{i=1}\Sigma^{i-k}R(i)F(i)$$

where 'k' is the length of the filter. The filter 'F' is then displaced by a distance 'd', and the corresponding signal values are multiplied by the filter coefficients as indicated in the figure. The result is a decimated signal 'S' 508. In the figure, we show the case where d=3 and k=5. Note that we can successively apply multiple stages of decimation. That is, the operation can be applied on 'S' to result in a further decimated signal.

FIG. 5(*b*) shows the interpolation step, where the signal 'S' 522 is interpolated through the use of an interpolation filter, 'F' 524. For the purpose of illustration, the signal 'S' 522 has been interpolated to increase the number of samples by a factor of 4. The figure shows the interpolation of values between 'S(2)' and 'S(3)' through the application of filter coefficients on the signal values 'S(1)' through 'S(4)'. Note that successive stages of interpolation can be consecutively applied. This example uses the interpolation method described in G. Goertzel, et al, "The design of Interpolation Filters and Their Application to Image Scaling and Rotation," herein given in Appendix A, and incorporated herein by reference in its entirety.

In the example embodiment, 'k=5', i.e. the filter 'F' consists of five points, whose values are [7/96, 24/96, 34/96, 24/96, 7/96]. These values are taken from "Digital Filters," R. W. Hamming, Prentice Hall, second edition, 1983. The values for the five points are interpreted as performing a least squares filtering operation. The distance 'd' is set to be 5 pixels, so there is no overlap between successive applications of 'F'. Thus the number of samples is reduced by a factor of five at each stage of decimation. In the example, two successive stages of decimation are applied.

This is followed by two stages of interpolation, where at each stage the number of samples is increased five fold. This example uses the interpolation method described in G. Goertzel et al., given in Appendix A. For the sake of illustration, the coefficients used are shown in the example embodiment. It will be obvious to those skilled in the art that other interpolation techniques such as spline interpolation could just as well be used. In this case there are five sets of four coefficients each, and the argument for each coefficient refers to the location of the point to be interpolated in the unit interval. These filter coefficients are used to weight the contributions of the signal values just prior to interpolation, indicated by S(1) through S(5) in FIG. 5(*b*). The first set of coefficients is interpreted as follows. F(0.2) gives the multiplication factor for the signal at position 0.2, units away (to the left) with weight 0.912883. The signal that is 1.2 away (to the left) is multiplied with weight −0.0609059. The signal that is −0.8 units away (i.e. 0.8 units to the right) with weight 0.156397, and the signal that is −1.8 units away with weight −0.00837421. The sum of these weighted products is the desired interpolated signal value.

F(1.2)=−0.0609059
F(0.2)=0.912883
F(−0.8)=0.156397
F(−1.8)=−0.00837421
F(1.4)=−0.0580303
F(0.4)=0.685906
F(−0.6)=0.403522
F(−1.6)=−0.0313974

F(1.6)=−0.0313974
F(0.6)=0.403522
F(−0.4)=0.685906
F(−1.4)=−0.0580303
F(1.8)=−0.00837421
F(0.8)=0.156397
F(−0.2)=0.912883
F(−1.2)=−0.0609059
F(1)=0 F(0)=1
F(−1)=0
F(−2)=0

Two stages of interpolation are used with the above set of coefficients in the example embodiment.

The choice of an appropriate filtering technique is very important. If the size of the filter applied is too small, it causes a tendency to follow the high frequency variations in the signal. This may make it unable to detect the presence of deviations such as power spikes. The result is truncated to the extent of the original signal, as there is no need for the extrapolated values at either end.

Many variations are possible, such as fitting a single quadratic or cubic to the entire signal and/or smoothing with a Gaussian kernel. The technique presented in the example embodiment is both efficient and robust.

After performing all the operations shown in FIG. 4, the processed signal is compared to the original signal to flag problem conditions. For instance, one can employ a tolerance band around the final signal. In one embodiment the tolerance band is set at ±1%. If an input signal pixel lies outside this tolerance band, it is marked as an erroneous pixel. The tolerance band is generally selected to be such as to provide a conservative judgment of the quality of the white calibration signal. If the white and/or black calibration signal lies within this tolerance band, one can generally be certain of the satisfactory quality of the calibration data.

In one embodiment, the total number of erroneous pixels is tallied, and reported as a measure of the quality of the white and/or black calibration process. For instance, if there is a sufficiently large number of erroneous pixels, (say greater than 1% of the total number of pixels), an error condition on the whole white and/or black calibration process is reported. When an error condition is reported suitable action is undertaken to improve the imaging equipment used. This may include replacing the light bulbs, checking the power supply, and/or cleaning the optics.

In an actual implementation of the method described, implemented in a C-program, superior performance resulted when compared to unfiltered white calibration files. The results of filtering of a few typical white signals are shown in FIGS. 6(*a*), 6(*b*) and 6(*c*).

Figure 6A:
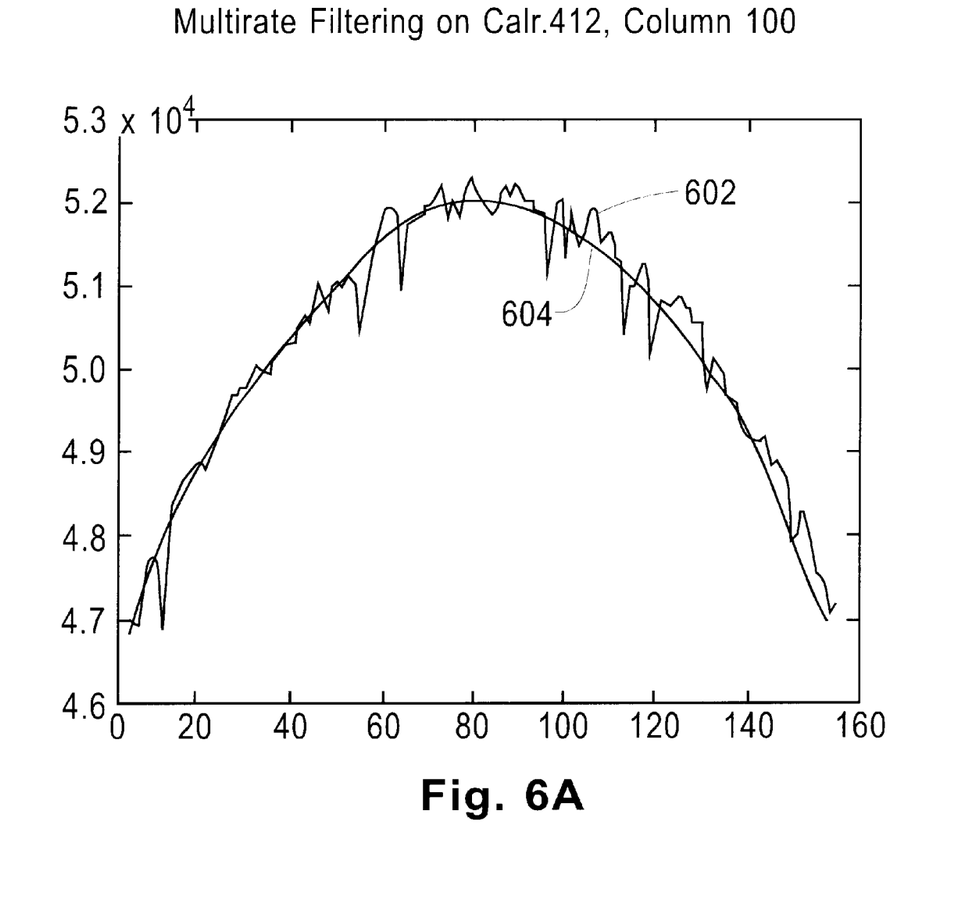
FIGS. 6(a), 6(b) and 6(c) illustrate results of extrapolation through a quadratic followed by multirate filtering, in accordance with the present invention.

FIG. 6(*a*) illustrates the result of extrapolation through a quadratic followed by multirate filtering. The curve with high frequency variations 602 is the original signal, and the smooth curve 604 depicts the result of filtering.

Figure 6B:
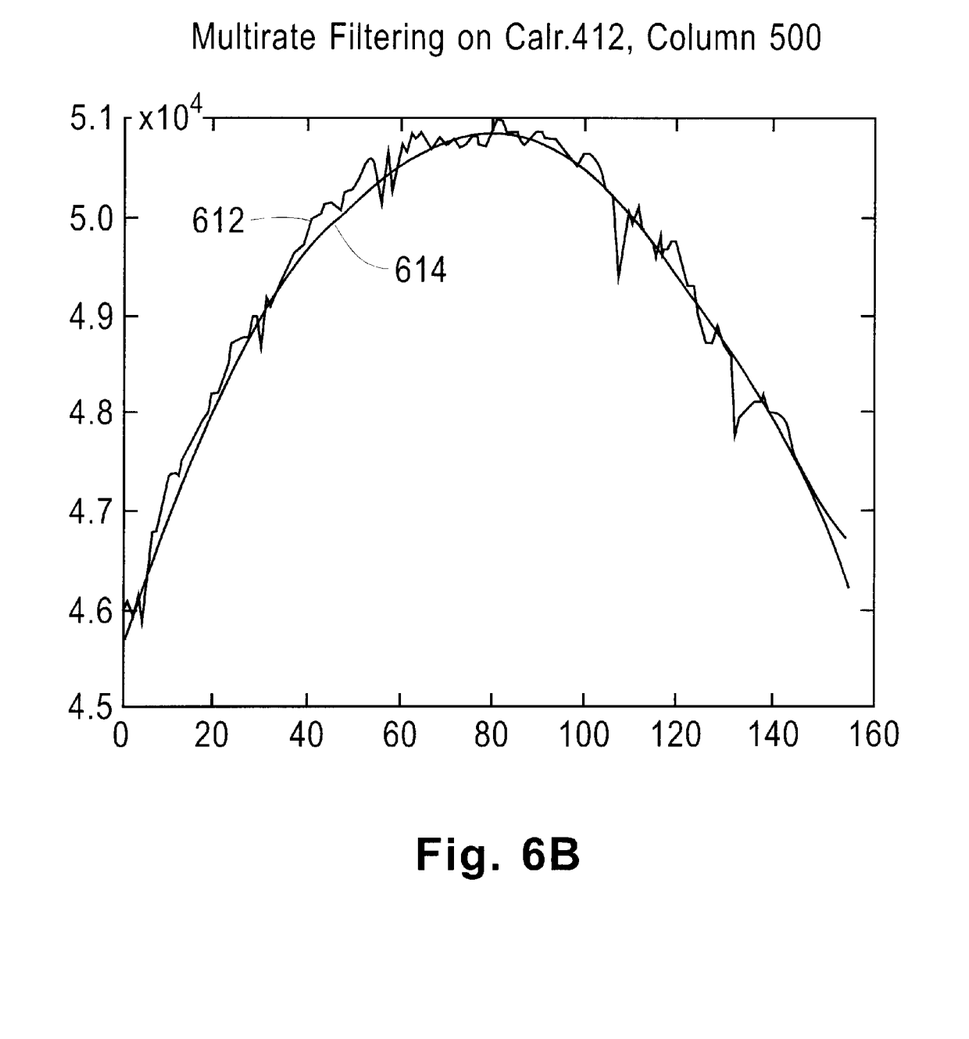
Figure 6C:
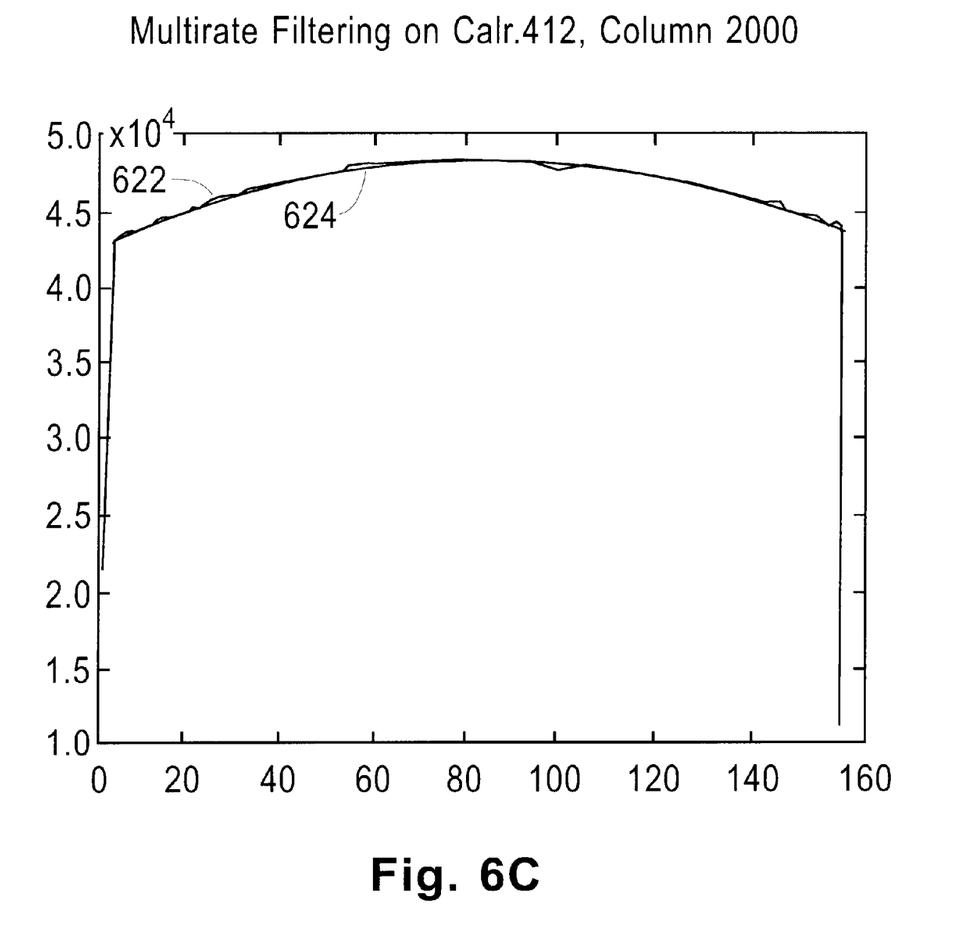

FIG. 6(*b*) illustrates another result of extrapolation through a quadratic followed by multirate filtering. The curve with high frequency variations 612 is the original signal, and the smooth curve 614 depicts the result of filtering FIG. 6(*c*) illustrates still another result of extrapolation through a quadratic followed by multirate filtering. The curve with high frequency variations is the original signal, and the smooth curve depicts the result of filtering.

There are many potential uses for the present invention. It may be used with any CCD image that performs a white and/or black calibration. The filtering operations improve the final image. This is because the final pixel value of every image pixel is a function of the white and/or black calibration signal. Thus any improvement in the white and/or black calibration signal improves the appearance of the final image.

Appropriate use of the present invention reduces or eliminates the problems associated with power supply spikes upon the white and/or black calibration signals. If power spikes are not filtered, scanned images may have a stripe through them representing the power spike.

Problems due to blotches on the white surface, and dust on the camera optics can are reduced or eliminated from effecting the final image quality. The invention also enables flagging information regarding the presence of problems with the white and/or black calibration data. This information can be used by scanner operators to take corrective action. The methods of this invention were used to enhance images scanned using the IBM TDI/Pro 3000 scanner.

It is noted that this invention may be used for many applications. Although the description is made for particular arrangements, the intent and concept of the invention is suitable and applicable to other arrangements and applications. It will be clear to those skilled in the art that other modifications to the disclosed embodiments can be effected without departing from the spirit and scope of the invention.

What is claimed is:

1. A system for obtaining at least one calibration profile for an image scanning apparatus, the system comprising:
    a light source;
    a calibration image having a surface illuminated by said light source;
    a detector to measure an intensity of light obtained from a plurality of points on said calibration image and to measure an intensity of light obtained from a dark image at said plurality of points;
    a first memory to store a first plurality of light intensity values measured by said detector at each of the points and also to store a plurality of black intensity values measured by said detector at each of said points to form a black calibration profile; and
    a smoothing module used: to smooth the plurality of light intensity values in the first memory so as form a calibration profile; to smooth the plurality of black intensity values in the first memory;
    and to employ extrapolation, filtering and multirate filtering, repeated a number of times, and decimation upon data of a subset of the plurality of points.

2. A system as recited in claim 1, further comprising a value corrector to correct a second plurality of light intensity values measured by said detector for the light obtained from an arbitrary image at each of the points using the calibration data.

3. A system as recited in claim 1 wherein the calibration image has uniform reflectivity across said image surface.

4. A system as recited in claim 1, wherein said smoothing module is useful to employ filtering.

5. A system as recited in claim 1 wherein said smoothing module is useful to employ extrapolation and decimation upon data of a subset of said plurality of points.

6. A system as recited in claim 5 wherein said filtering includes multirate filtering.

7. A system as recited in claim 1 wherein the detector is also useful to measure an intensity of light obtained from a dark image at said plurality of points, and said first memory is to also store a plurality of black intensity values measured by said detector at each of the points to form a black calibration profile.

8. A system as recited in claim 7, wherein the smoothing module is also useful to smooth the plurality of said black intensity values in said first memory.

9. A system as recited in claim 8, wherein said smoothing module is useful to employ extrapolation, filtering and decimation upon data of a subset of said plurality of points.

10. A system as recited in claim 1, wherein the calibration image is obtained from chromalin paper.

11. A system as recited in claim 1, wherein the detector is a CCD detector.

12. A system as recited in claim 1, wherein said plurality of points are positions of pixels of said calibration image, said calibration image having x rows of pixels and y columns of pixels.

13. A system as recited in claim 9, wherein the filtering includes multirate filtering.

* * * * *